US012810387B2

(12) United States Patent
Feng et al.

(10) Patent No.: US 12,810,387 B2
(45) Date of Patent: Nov. 24, 2026

(54) EDGE ENHANCEMENT FOR SKY REPLACEMENT

(71) Applicant: Adobe Inc., San Jose, CA (US)

(72) Inventors: Guotong Feng, San Jose, CA (US); Jianming Zhang, Fremont, CA (US); Alan Erickson, Franktown, CO (US)

(73) Assignee: Adobe Inc., San Jose, CA (US)

( * ) Notice: Subject to any disclaimer, the term of this patent is extended or adjusted under 35 U.S.C. 154(b) by 594 days.

(21) Appl. No.: 18/352,828

(22) Filed: Jul. 14, 2023

(65) Prior Publication Data

US 2024/0338794 A1 Oct. 10, 2024

Related U.S. Application Data

(60) Provisional application No. 63/495,300, filed on Apr. 10, 2023.

(51) Int. Cl.
*G06T 5/50* (2006.01)
*G06T 7/194* (2017.01)

(52) U.S. Cl.
CPC ................ *G06T 5/50* (2013.01); *G06T 7/194* (2017.01); *G06T 2207/20084* (2013.01); *G06T 2207/20192* (2013.01); *G06T 2207/20221* (2013.01)

(58) Field of Classification Search
CPC . G06T 5/50; G06T 7/194; G06T 2207/20084; G06T 2207/20192; G06T 2207/20221; G06T 5/70; G06T 5/73; G06T 7/12; G06T 11/00
See application file for complete search history.

(56) References Cited

U.S. PATENT DOCUMENTS

2005/0264833 A1* 12/2005 Hiraoka ................. H04N 1/622 358/1.9
2020/0134834 A1* 4/2020 Pao ........................... G06T 7/11
2023/0005197 A9 1/2023 Zhang et al.

OTHER PUBLICATIONS

Shreyas Yadav “Sky Replacement Technique in Adobe Photoshop” published 2021 (Year: 2021).*
Of Binglin Niu et al, “Semantic Segmentation of Remote Sensing Image Based on Convolutional Neural Network and Mask Generation” Mathematical Problems in Engineering vol. 2021 (Year: 2021).*
Shreyas Yadav, a. “Sky Replacement Technique in Adobe Photoshop” pub., 2021 (Year: 2021).*
Binglin Niu et al., “Semantic Segmentation of Remote Sensing Image Based on Convolutional Neural Network and Mask Generation” Mathematical Problems in Engineering vol. 2021 (Year: 2021).*

* cited by examiner

*Primary Examiner* — Mekonen T Bekele
(74) *Attorney, Agent, or Firm* — Nicholson De Vos Webster & Elliott LLP

(57) ABSTRACT

Techniques are disclosed for automatic sky replacement with edge lighting enhancements. A method of automatic sky replacement includes generating a clean mask and a compositing mask for an input image using a mask generation network. A plurality of layers is generated using the clean mask and the compositing mask. The plurality of layers includes an edge lighting layer generated based on a subset of the plurality of layers and the clean mask. A composite image is generated by combining the input image and the plurality of layers including the edge lighting layer.

20 Claims, 13 Drawing Sheets

EDGE ENHANCEMENT FOR SKY REPLACEMENT

CROSS-REFERENCE TO RELATED APPLICATION

This application claims the benefit of U.S. Provisional Application No. 63/495,300, filed Apr. 10, 2023, which is hereby incorporated by reference.

BACKGROUND

Image editing is a process used to alter properties of an image, for example, to increase the quality of an image or video. In some cases, an image is altered to have a desired appearance or to improve the visibility or clarity of the image. Replacing portions of an image and inserting portions of one image into another are common image editing tasks. For example, in some cases users may wish to replace the sky in one image with the sky from another image. Sky replacement and other region replacement tasks can be performed by image editing software applications. However, transferring portions of one image into another image can be difficult and time-consuming.

SUMMARY

Introduced here are techniques/technologies that perform image object replacement or image region replacement (e.g., an image editing system for replacing an object or region of an image with an object or region from another image). For example, the image editing system may replace a sky portion of an image with a more desirable sky portion from a different sky replacement image (e.g., a sky preset image).

Embodiments use an improved blending model to preserve fine edge details. In some embodiments, sky replacement is performed automatically, and non-destructively, using a layer structure. The layer structure enables the non-destructive effect. That is, the replacement effect is provided by adding layers on top of an original image rather than editing the image itself. In particular, the improved blending model includes a new layer group in the layer structure. These new layers include two adjustment layers coupled with a clean mask that is sharper, preserving more edge detail, than the compositing mask, while keeping the rest of the layers the same.

Accordingly, embodiments use the edge information included in the clean mask to produce a properly enhanced contrast along the edges. Furthermore, the halo artifacts near the boundary of foreground and background are also largely reduced when replacing a bright sky with a darker sky or vice versa. This results in much better overall quality along the edges than prior techniques.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
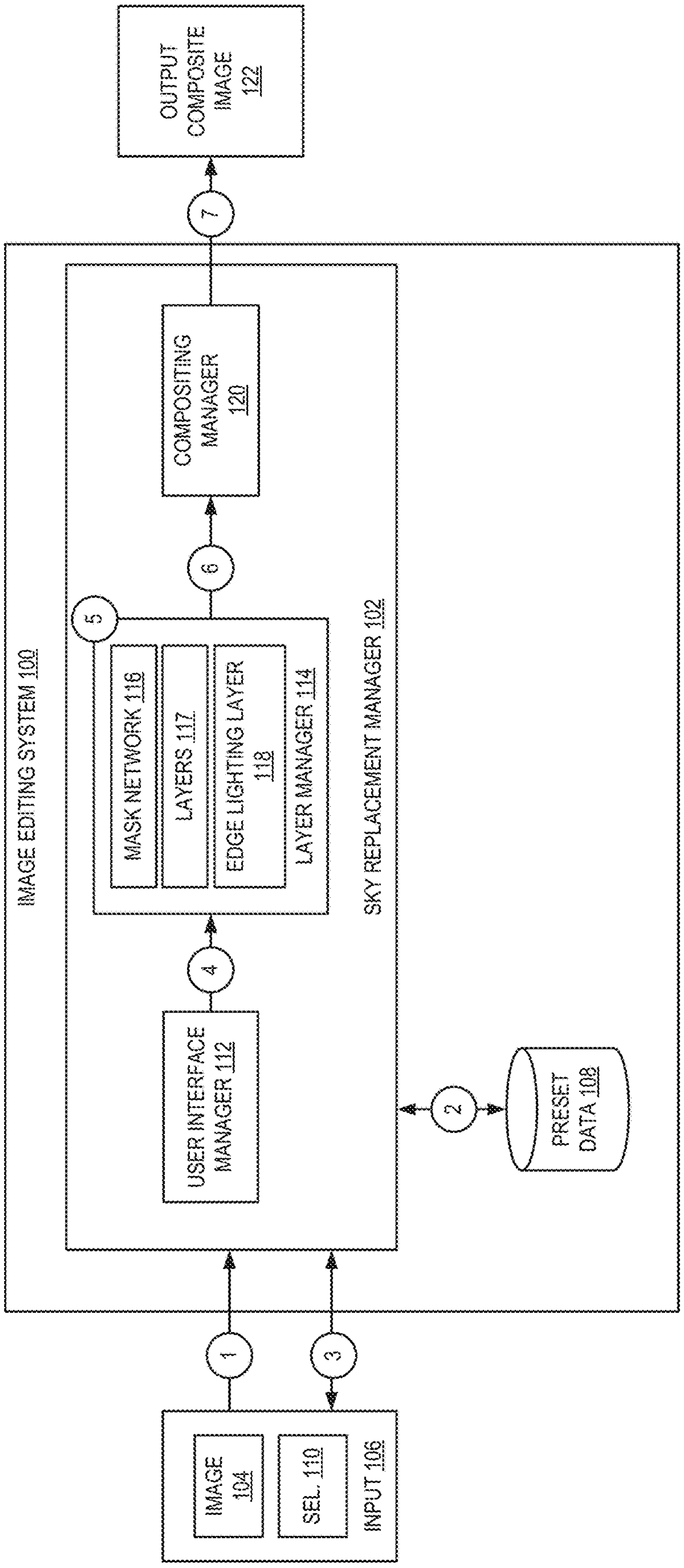
FIG. 1 illustrates an example of sky replacement in accordance with one or more embodiments.

One or more embodiments of the present disclosure include an image editing system which can perform sky replacement. The image editing system generates a composite image corresponding to an input image in which the background (e.g., sky) has been replaced with a different background. Current sky replacement approaches generally provide good composite quality. However, current approaches suffer from a number of common artifacts. For example, these existing approaches do not handle fine detail at the edges of objects. This leads to a loss of detail along the edges of thin-line objects (e.g., tree branches, cables, etc.). This problem is more substantial in some cases where there is a larger tone difference between the original sky and the new sky. This can also lead to a halo effect, where the brightness of the previous sky bleeds through the new sky (e.g. a darker sky).

To address these and other issues with prior techniques, embodiments include an improved sky replacement process that automatically segments the foreground and background of an image (e.g., the input image) using one or more image segmentation masks. In some examples, two region masks are generated that have varying levels of sharpness at the boundary (e.g., the boundary between the foreground and the background). These masks may include a clean mask that captures fine detail and a compositing mask that achieves an appropriate level of boundary sharpness for compositing purposes. These masks are then used to create a plurality of layers which, when combined with the input image, non-destructively change the sky of the input image.

For example, in some embodiments, a defringing layer is generated by combining a region mask of the original image with a grayscale version of the replacement image (e.g., an image including a new sky). The defringing layer is combined with the original image and a region-specific layer (e.g., a layer that reveals a replacement background from the replacement image) to produce a composite image. Accordingly, the produced composite image may include the foreground of the original image and the background of the replacement image, but the lighting of the composite image near the region boundary is more realistic.

Additionally, embodiments use an improved blending model to preserve fine edge details. In some embodiments, sky replacement is performed automatically, and non-destructively, using a layer structure. The layer structure enables the non-destructive effect. That is, the replacement effect is provided by adding layers on top of an original image rather than editing the image itself. In particular, the improved blending model includes a new layer group in the layer structure. These new layers include two adjustment layers coupled with a clean mask that is sharper, preserving more edge detail, than the compositing mask, while keeping the rest of the layers the same.

Accordingly, embodiments use the edge information included in the clean mask to produce a properly enhanced contrast along the edges. Furthermore, the halo artifacts near the boundary of foreground and background are also largely reduced when replacing a bright sky with a darker sky or vice versa. This results in much better overall quality along the edges than prior techniques.

FIG. 1 illustrates an example of sky replacement in accordance with one or more embodiments. As shown in FIG. 1, an image editing system 100 can include a sky replacement manager 102. Although embodiments are described herein with respect to a sky replacement application, in various embodiments any identifiable region of an image may be automatically replaced with content from a corresponding region of another image. The image editing system may be implemented as an application executing on a device (e.g., client device, server device, etc.), as an application executing in a cloud computing environment, or other execution environment. In the example of FIG. 1, a user interacts with the image editing system 100. For example, the user may interact directly with the image editing system 100 (e.g., on a user device) or may access the image editing system 100 (e.g., on a server device) using a client device (e.g., laptop, desktop, mobile device, etc.).

As shown at numeral 1, the user sends a request to the sky replacement manager to replace the sky portion of an input image with a sky from a different image. In some embodiments, the user provides the input image 104 (e.g., uploading the image 104 to the image editing system 100, selecting the image 104 from a storage device accessible to the sky replacement manager 102, etc.). In some embodiments, the image 104 is provided as an input 106 from the user which may be provided to the sky replacement manager 102 via user interface manager 112.

At numeral 2, the sky replacement manager 102 can access preset data 108 to identify reference images (e.g., "presets") that depict alternative sky images to be presented to the user. For example, at numeral 3, all, or a portion of, the preset data 108 may be presented to the user via user interface manager 112. In some embodiments, the preset data 108 includes background information including the region location information and a low-resolution image data for each of the set of sky images (e.g., presets) in a same preset information file. In some examples, preset data 108 stores high-resolution image data for each of the sky images in separate image files. In some examples, the separate image files include JPEG, PNG, or other appropriate image file types. According to some embodiments, preset data 108 may be configured to store a sky information file including the region location information and the low-resolution image data in a sky information file and to store high-resolution image data for the sky images in separate image files. In some embodiments, the user may browse the preset data 108 via the user interface manager 112 to select 110 a sky image from the preset data 108 that includes the desired sky to be used with the input image. In some embodiments, the selection 110 is provided as a further input 106 from the user.

At numeral 4, the input image and the sky image are provided to layer manager 114. The layer manager can automatically segment the input image and the preset image as well as create layers to perform the sky replacement operation, at numeral 5. The layer manager 114 can use one or more mask networks 116 (also referred to herein as mask generation networks) to segment the original image to identify a foreground and a background. Then, the image editing apparatus 115 creates a composite image using the foreground of the original image and a sky image region from the selected replacement (e.g., preset) image. Multiple segmentation masks may be combined with the sky replacement image to create a sky replacement layer, and one of these segmentation masks (or a separate mask) may also be combined with a greyscale version of the replacement sky to create a defringing layer (e.g., which in some case may be referred to as a lighting layer) that reduces the halo effect. As discussed further, a clean mask (e.g., a sharp mask that retains fine detail of at least a region of the input image) and a compositing mask (e.g., a soft mask used for blending portions of different images together into a composite) are used with additional layers of the layer stack to generate the composite image.

Embodiments of the present disclosure utilize compositing methods that generate high-quality composites while minimizing fringing and halo artifacts. In some examples, the methods described herein generate multiple masks—e.g., a clean mask and a compositing mask- and use carefully selected blending modes to combine the layers using these masks. These methods may be performed automatically and work well across many sky replacement examples. In some cases, the input to the system includes a single image and a sky reference image (this image may also be referred to "sky image", "preset image", "background image", etc.) is applied for the replacement sky. In other embodiments, a user selects two images and a composite is made from the two images. In some cases, the system automatically selects portions of the images for composition (e.g., it can identify and replace a sky region automatically). According to embodiments of the present disclosure, a layer structure is used that enables non-destructive effects.

Layer manager 114 is also responsible for generating sky replacement layers 117. The layer structure may include a layer for the original image, a sky replacement layer (e.g. based on a combination of a sky background mask from the original image and a sky region from the replacement image), a defringing layer (e.g., based on a mask from the original image and a grayscale version of the replacement sky), a color harmonization layer, and/or an edge lighting layer 118. As discussed further below, the edge lighting layer includes a clean mask and the original image. The clean mask is used to determine properties of the original image along the edge formed between the background (e.g., sky) and foreground (e.g., remainder of the image) of the input image. Based on these properties, a blending mode is determined for the edge lighting layer to be used during compositing. This allows for fine detail to be preserved along the edge while also reducing halo artifacts.

At numeral 6, the sky replacement layers (e.g., layers 117 and edge lighting layer 118) are provided to compositing manager 120. Compositing manager 120 can generate a composite image 122 by combining the layers and the input image 104. In some embodiments, the user can selectively apply some or all of the layers, adjust the properties associated with each layer, etc. via user interface manager 112.

Figure 2:
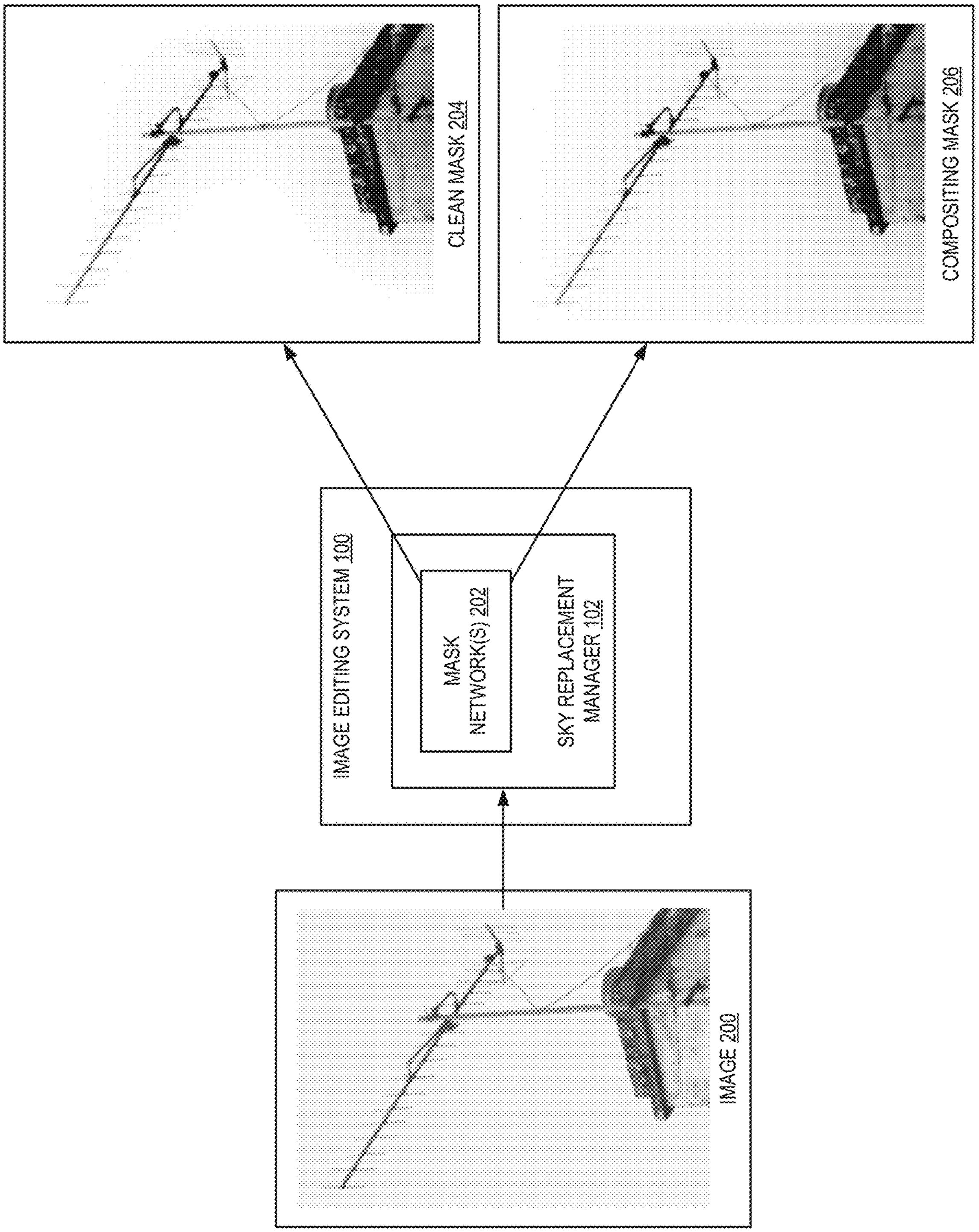
FIG. 2 illustrates an example of generating masks for an input image in accordance with one or more embodiments.

FIG. 2 illustrates an example of generating masks for an input image in accordance with one or more embodiments. As shown in FIG. 2, an input image 200 is provided to sky replacement manager 102. As discussed, the sky replacement manager may include one or more mask network(s) 202. A mask network 202 may be a neural network or other machine learning model which has been trained to generate a mask from an input image. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

In the example of FIG. 2, the mask network 202 can generate a clean mask 204 and a composite mask 206. According to some embodiments, mask network 202 generates a set of region masks for a first image (e.g., input image 200) using a mask network 202, where the region masks correspond to a same semantically related region of the first image. In some examples, mask network 202 combines the second region mask with a third region mask of the set of region masks to create a combined region mask, where the region-specific layer is generated using the combined region mask. In some examples, the first region mask has a more gradual mask boundary than the second region mask. In some examples, the semantically related region of the first image includes a first sky region, and the composite image includes a second sky region from a second image.

According to some embodiments, mask network 202 generates a first region mask, a second region mask, and a third region mask corresponding to a same semantically related region of a first image. In some examples, mask network 202 applies a mask brush to adjust the combined region mask. In some examples, mask network 202 applies a fade edge adjustment, a shift edge adjustment, or both the fade edge adjustment and the shift edge adjustment after applying the mask brush. In some examples, mask network 202 applies the mask brush to further adjust the combined region mask. In some examples, mask network 202 automatically reapplies the fade edge adjustment, the shift edge adjustment, or both the fade edge adjustment and the shift edge adjustment after reapplying the mask brush. In some examples, the first region mask has a more gradual mask boundary than the second region mask, and the second region mask has a more gradual boundary than the third mask. In some examples, the semantically related region of the first image includes a first sky region, and the composite image includes a second sky region from the second image.

In some examples, the mask network 202 includes a convolutional neural network (CNN). A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

In some embodiments, one or more components of the image editing system 100 may include (or implement) one or more aspects of an artificial neural network (ANN). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different trans-formations on their inputs. The initial layer is known as the input layer and the last layer is known as the output layer. In some cases, signals traverse certain layers multiple times.

In some embodiments, multiple neural networks are used for generating segmentation masks. For example, in one embodiment, the mask network 202 may include a model for generating a base mask, one for refining the base mask, and one for detecting difficult regions (e.g., trees or wires). All of the models may be used to generate the following masks: a clean mask 204 (e.g., for the edge lighting layer), a composite mask 206 (e.g., for the region replacement layer), and a lighting mask (e.g., for the defringing layer).

According to some embodiments, mask network 202 generates a background region mask for a first image using a mask network 202. The mask network 202 may be configured to generate a background region mask for a first image. In some examples, the mask network 202 includes a convolutional neural network.

Using the clean mask 204, the boundary between the foreground and background is pushed more aggressively towards the landscape (e.g., foreground) or non-sky regions (e.g., background) than the compositing mask 206. This implies that the highlight pixels in the clean mask cover more edges than the compositing mask, therefore the clean mask is a better layer mask for adjusting the levels (e.g., tones) on the edges and in the sky region. Compositing mask 206 provides improved blending between the new background and the foreground, providing more realistic results. Unlike prior techniques which only used the compositing mask, the clean mask is used to enhance the region of the composite image around the edge separating the foreground and background. In particular, the clean mask 204 may be used in generating the edge lighting layer.

Although embodiments are described as generating the clean mask using the mask network(s), in some embodiments the clean mask may be provided with the image (e.g., generated by an external system). For example, the user may provide a clean mask that they have generated using their own segmentation model or via other masking techniques.

Figure 3:
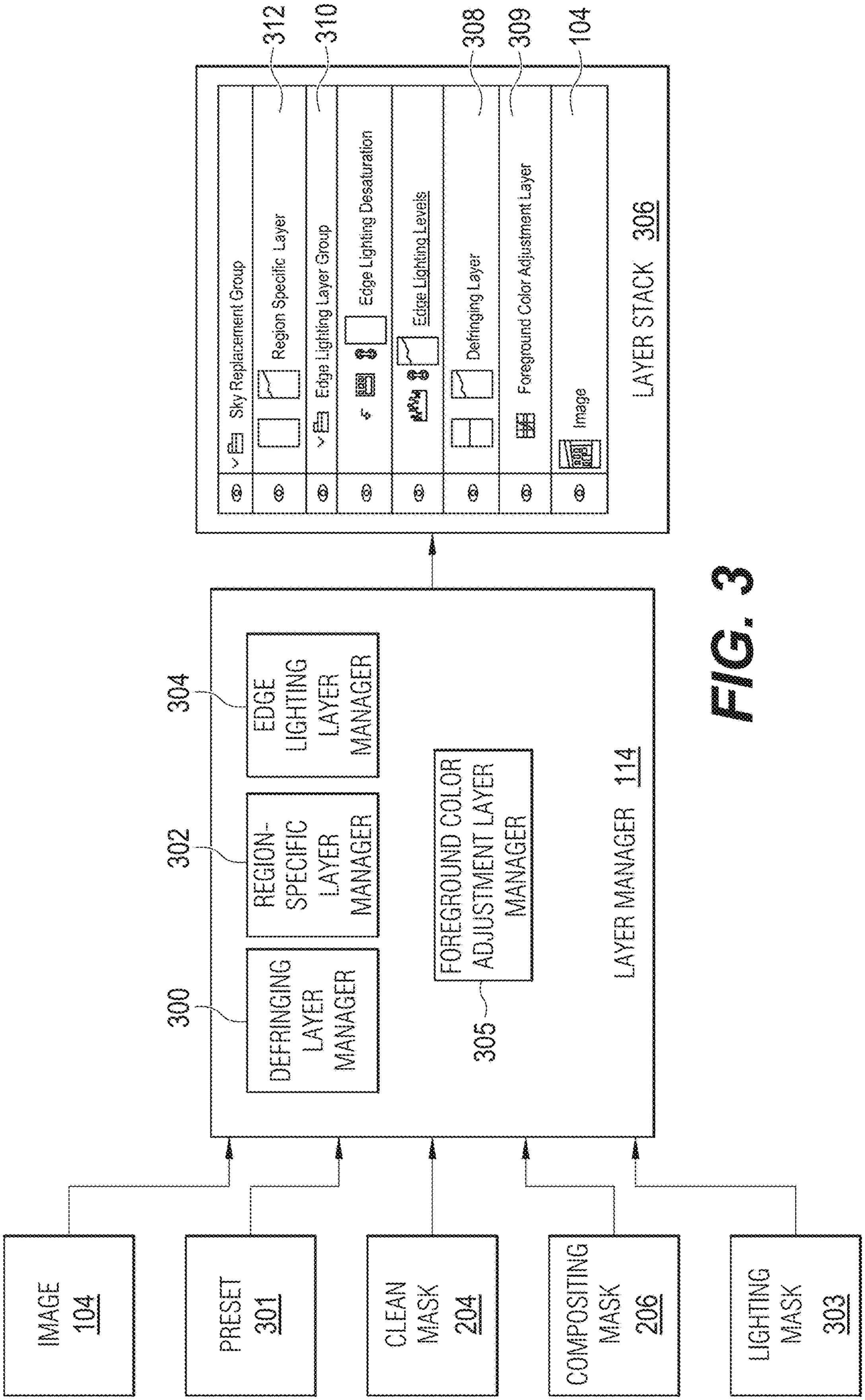
FIG. 3 illustrates an example of generating a plurality of layers for an input image in accordance with one or more embodiments.

FIG. 3 illustrates an example of generating a plurality of layers for an input image in accordance with one or more embodiments. As shown in FIG. 3, layer manager 114 can receive the input image 104, the clean mask 204, the compositing mask 206, the preset image 301, a lighting mask 303, and use these to generate one or more layers (e.g., defringing layer, region-specific layer, and edge lighting layer).

According to some embodiments, defringing manager 300 generates a defringing layer by combining a lighting mask 303 with a grayscale version of a second image (e.g., preset 301). In some embodiments, the lighting mask 303 is a mask which allows for smooth lighting adjustment across a boundary between the foreground and background areas. As used here, the background area corresponds to the region-specific area (e.g., from preset 301) and the foreground area corresponds to the existing portion(s) of the image 104 that were not replaced. The lighting mask 303 may be a softer mask than the clean mask 204 or compositing mask 206. As used herein, a "softer" mask refers to a mask having a more gradual mask boundary than another mask. For example, the lighting mask 303 has a more gradual mask boundary than either the clean mask 204 or the compositing mask 206. In some examples, within the layer stack 306, the defringing layer 308 is located between the first image and the edge lighting layer 310. In some examples, the defringing layer 308 is located between the foreground color adjustment layer and the edge lighting layer. In some examples, defringing manager 300 adjusts a position of the second image (e.g., preset image) relative to the first image (e.g., image 104). In some examples, defringing manager 300 automatically regenerates the defringing layer and the region-specific layer based on the position.

In some embodiments, foreground color adjustment layer manager 305 generates a foreground color adjustment layer 309 based on foreground property data and background property data. In some examples, foreground color adjustment layer manager 305 automatically adjusts the foreground color adjustment layer 309 based on the adjusted colors. In some examples, foreground color adjustment layer manager 305 computes a set of color harmonization curves, where the foreground color adjustment layer 309 is generated based on the color harmonization curves. In some examples, the foreground color adjustment layer 309 is located between the image 104 and defringing layer 308. In some examples, the foreground color adjustment layer 309 applies colors from a background portion of the preset image 301 to a foreground portion of the image 104.

According to some embodiments, region-specific layer manager 302 generates a region-specific layer by combining the compositing mask with the preset image. As discussed, the compositing mask is a soft mask suitable for blending. In this example, the compositing mask is used for blending the region of the preset image into the original image 104. In some examples, the region-specific layer manager 302 includes a brush tool, a fade edge slider, and a shift edge slider. Although embodiments are generally described with respect to the region being the sky portion of the image, in various embodiments other regions may also be used. As shown, the region-specific layer is located after the edge lighting layer group 310.

According to some embodiments, edge lighting layer manager 304 generates an edge lighting layer group based on the clean mask and the original image 104. In particular, the edge lighting layer group 310 (also referred to herein as the edge lighting layer) includes an edge lighting desaturation layer and an edge lighting levels adjustment layer. The edge lighting levels adjustment layer uses the histogram of the image that results from the defringing layer to set highlight, shadow, and midtone properties. The edge lighting desaturation layer is created by automatically setting the saturation parameter for the edge lighting levels adjustment layer to its lowest value. This removes colors from the edge lighting levels adjustment layer, leaving only grayscale tone values. A blending mode is then determined based on the values of the edge pixels compared to the values of the sky (or other region) pixels in the original image, as discussed further below. The edge lighting layer is located between the region-specific layer and the defringing layer.

The layers generated by layer manager 114 may be controlled using a layer stack 306 which is shown as part of a user interface. As shown in FIG. 3, the layer stack includes new layers associated with the edge lighting layer. In particular, the edge lighting layer may include an edge lighting desaturation layer and an edge lighting levels adjustment layer. As shown, this may be depicted as a new layer group called Edge Lighting Group, added in between the defringing layer 308 and the region-specific layer 312 in the current layer stack. The Edge Lighting Group includes two layers, Edge Lighting Levels and Edge Lighting Desaturation. Edge Lighting Levels is a levels adjustment layer, which uses a clean mask as the layer mask. Edge Lighting Desaturation is a hue/saturation adjustment layer that applies desaturation to the edge lighting levels adjustment layer through a clipping mask.

Figure 4:
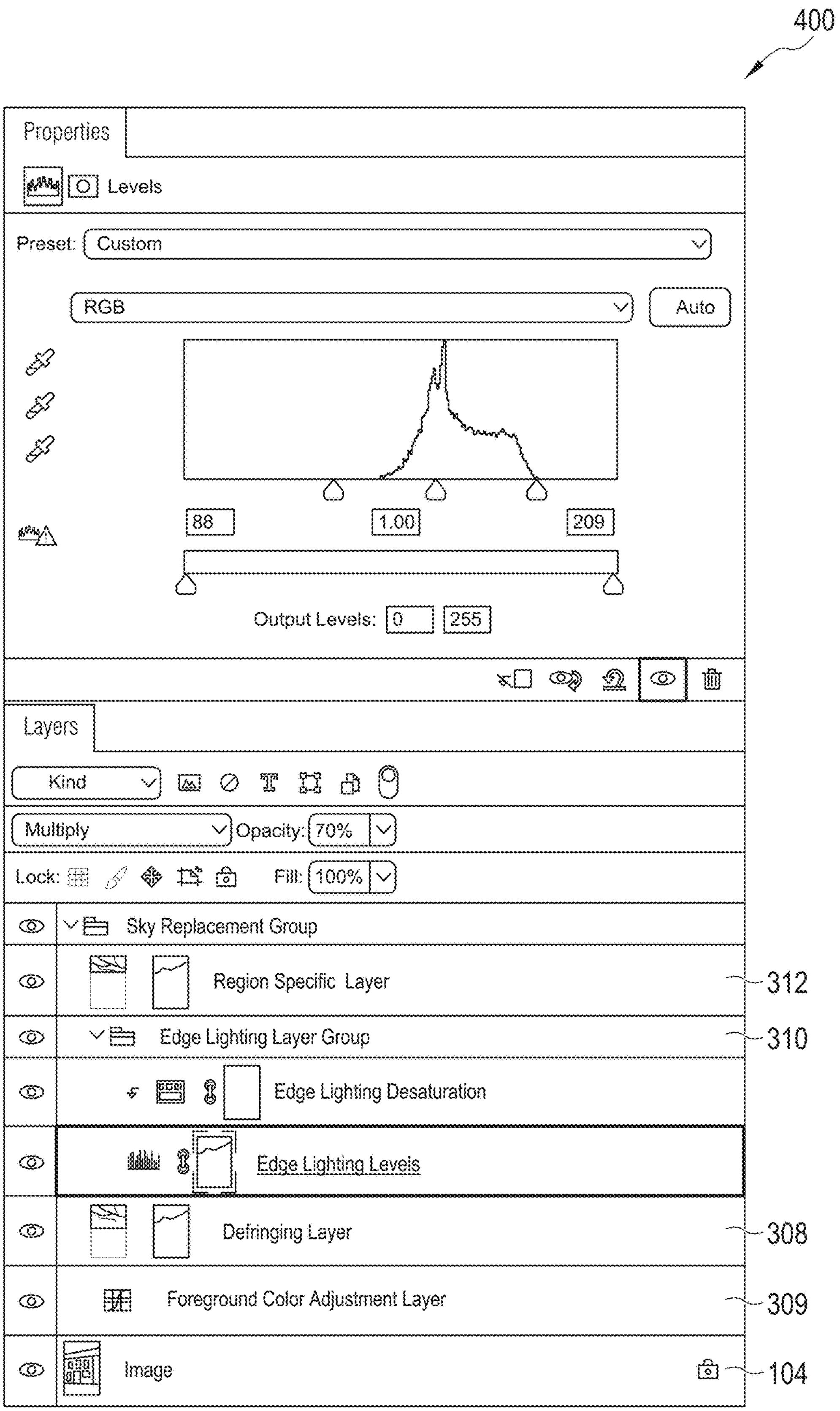
FIG. 4 illustrates a diagram of an edge lighting levels adjustment layer properties in accordance with one or more embodiments.

FIG. 4 illustrates an example of an edge lighting levels adjustment layer properties panel 400 in accordance with one or more embodiments. FIG. 4 shows the parameter settings of the Edge Lighting Levels adjustment layer. The histogram is computed based on the image that results from the defringing layer. The shadow and highlight input levels are set to the end points of the histogram, and the midtone input level is set to a value in the center between the shadow and highlight values (in this example 1), which is the mid-point between the shadow and highlight input levels.

Figure 5:
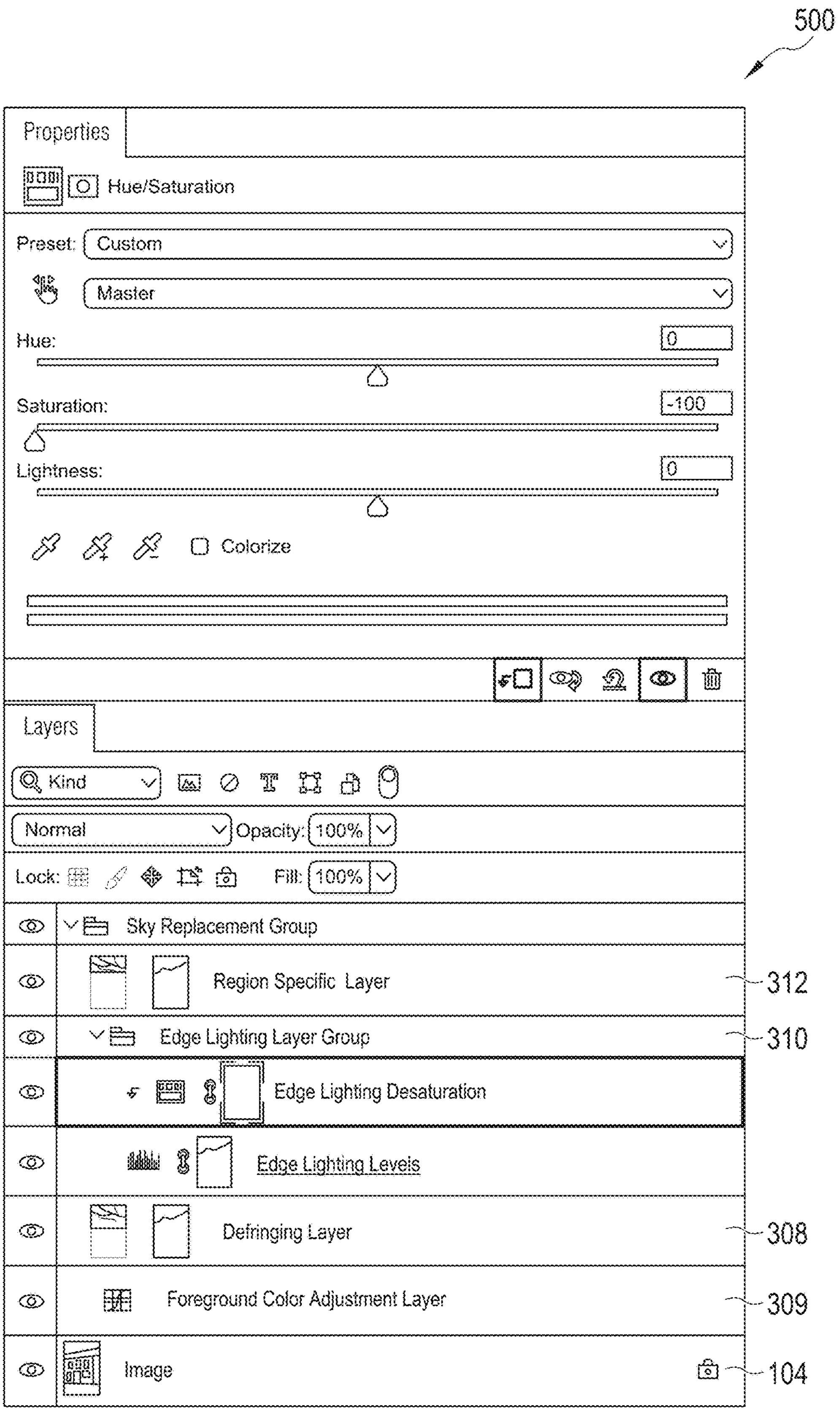
FIG. 5 illustrates an example of an edge lighting desaturation layer properties in accordance with one or more embodiments.

FIG. 5 illustrates an example of an edge lighting desaturation layer properties panel 500 in accordance with one or more embodiments. As shown, the saturation default is set to the minimum (i.e., −100), and the rest of the default settings remain unchanged. As a result, this adjustment layer extracts the luminance channel of the edge lighting levels adjustment layer, and discards the chrominance channels. This will avoid undesired color of the original regions along the edges from being enhanced by the Edge Lighting Levels adjustment.

Figure 6:
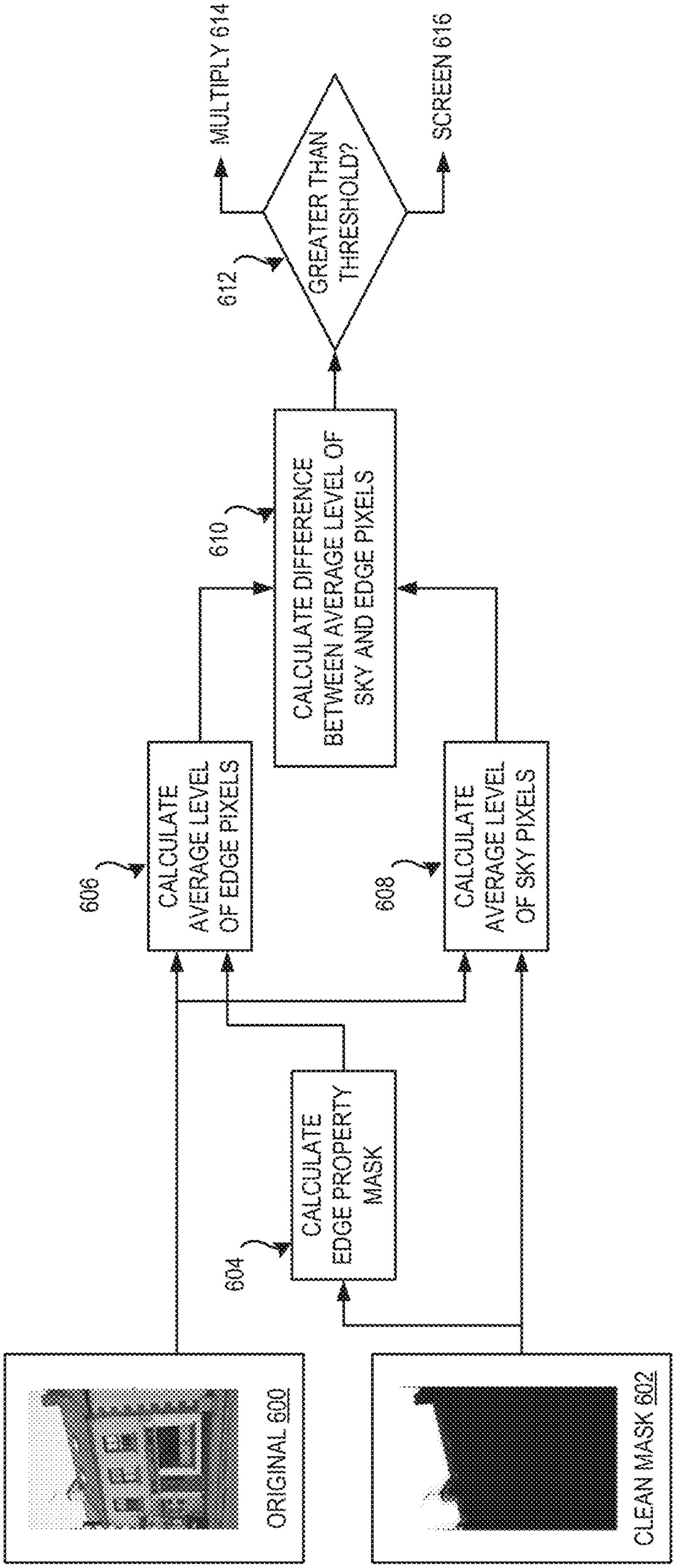
FIG. 6 illustrates a diagram of a process of determining a blend mode in accordance with one or more embodiments.

FIG. 6 illustrates a diagram of a process of determining a blend mode in accordance with one or more embodiments. In some embodiments, the blending mode of the Edge Lighting Levels adjustment layer is either Multiply or Screen, which is automatically determined by the process shown in FIG. 6. The Multiply mode multiplies the colors of the blending layer and the base layer, resulting in a darker color. The result of Screen mode is the opposite of Multiply: wherever either layer was darker than white, the composite is brighter.

As shown in FIG. 6, the original image 600 and a clean mask 602 generated based on the original image are received (e.g., by the layer manager or other component of the sky replacement manager, discussed above). At 604, an edge property mask is computed from the clean mask. The edge property mask is a binary mask which indicates whether a given pixel is part of an edge between a specific region (in this instance, the sky) and the foreground (e.g., each pixel has a binary value, indicating edge or non-edge).

Using the tone values of each pixel (e.g., from the original image) and the edge property mask, the average tone level of the edge pixels is calculated at 606. Similarly, at 608, the average tone level of sky pixels is calculated using the tone values of each pixel forming the sky region (e.g., from the original image) and the clean mask. The difference between the average levels of the sky and edge pixels is then calculated at 610 and compared with a predefined threshold. In various embodiments, the threshold value may be defined by the user, the system, inferred from the image, or using other techniques. In some embodiments, where the tone values vary in the range of [0, 1], the threshold value was set to 0.1. However, other threshold values may also be used.

If, at 612, the difference is greater than the threshold, the blend mode is set to Multiply. Otherwise, it is set to Screen. The logic behind this algorithm is that whether the edges and sky region should be darkened or brightened depends only on the relationship between the original sky and edge regions in terms of the average tone, which ensures that the original contrast between the sky and edges will be properly preserved after compositing. This means that the blending mode of the edge lighting levels adjustment layer is independent of that of the defringing layer, which is determined by the difference between the original sky and the new sky in terms of the average levels instead. Note that to reduce the computation of this algorithm, the average levels of sky and edge pixels can be calculated using lower resolution input data (e.g. up to 2 k×2 k) instead of the full resolution.

Figure 7:
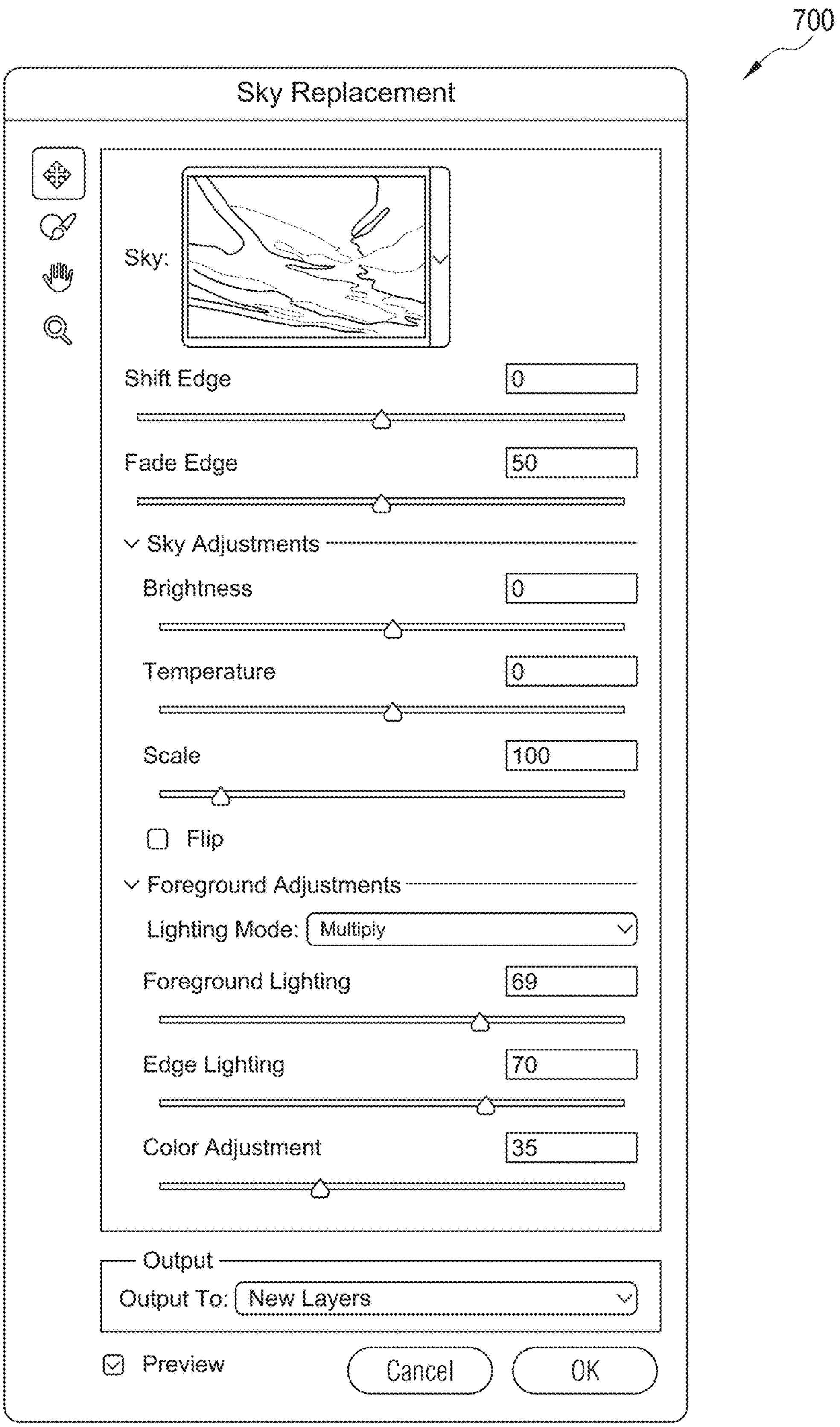
FIG. 7 illustrates an example of a user interface for modifying sky replacement settings in accordance with one or more embodiments.

FIG. 7 illustrates an example of a user interface for modifying sky replacement settings in accordance with one or more embodiments. As shown in FIG. 7, a new slider called Edge Lighting has been added in the group of Foreground Adjustments on the dialog. The slider allows the user to control the opacity of the edge lighting levels adjustment layer, where higher values preserve more details along edges and reduce more halos. The default value of the slider is set to 70. Note that the effects of Edge Lighting could cause overshoot along edges in some local regions where the tone difference between the original sky and edges is opposite to the overall difference in all regions. In such cases the user can manually decrease the Edge Lighting values properly. FIG. 7 also shows that the Fade Edge default is set to 50, where the Fade Edge slider is used to adjust the softness of the sky and foreground boundary by combining the clean mask and composting mask.

Figure 8:
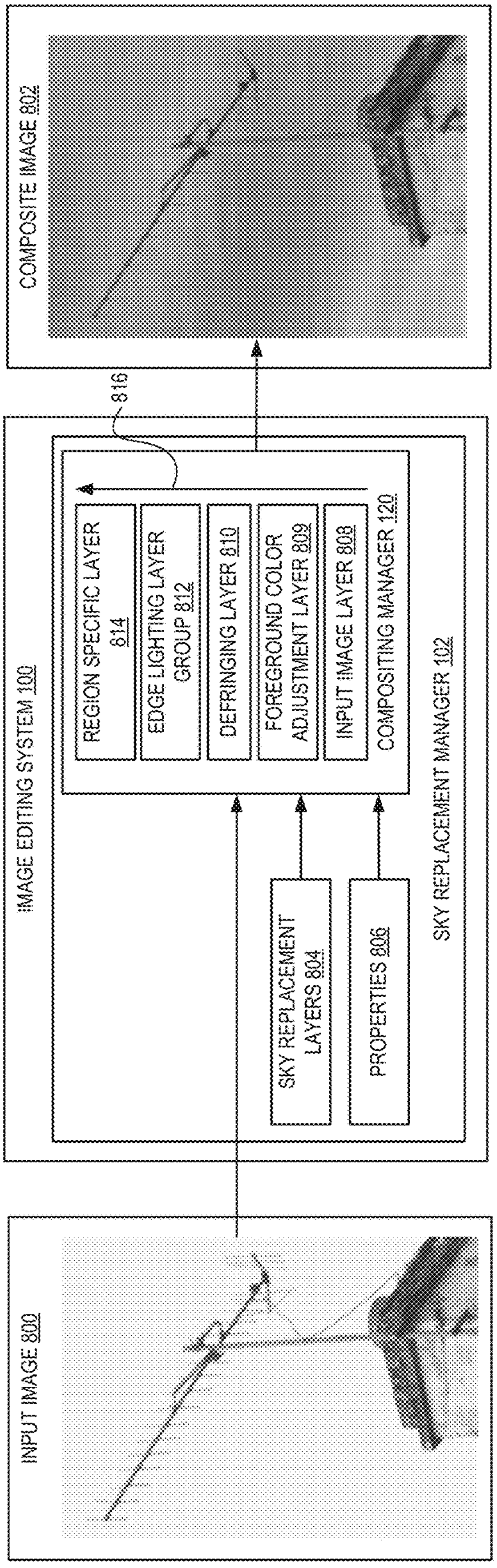
FIG. 8 illustrates an example of compositing layers to generate a composite image in accordance with one or more embodiments.

FIG. 8 illustrates an example of compositing layers to generate a composite image in accordance with one or more embodiments. As shown in FIG. 8, the compositing manager 120 generates a composite image 802 from an input image 800. As discussed, each layer of the sky replacement layers 804 is additive, making the sky replacement non-destructive of the original input image 800. The compositing manager 120 generates the composite output image 802 by combining the input image 800 with the sky replacement layers 804 in a specific order based on associated layer properties 806. As discussed, in particular, the sky replacement layers 804 include edge lighting layers (e.g., edge lighting desaturation and edge lighting levels adjustment). These layers help preserve fine foreground detail from being lost in the sky replacement (e.g., by being obscured by halo artifacts, lost via a compositing mask, etc.).

As discussed, the order of the layers affects the quality of the final composite image. As shown in FIG. 8, the order the layers are combined is shown at 816. In particular, the first layer is the input image layer 808. In some embodiments, this is followed by a foreground color adjustment layer 809. The foreground color adjustment layer 809 is used to adjust the foreground color based on the color of the new region obtained from the preset. This layer is then combined with the defringing layer 810, which reduces the fringing/halo artifacts due to a tone difference between the original and replacement content along with the soft composting mask. This is followed by the layers of the edge lighting layer group 812 and then the region-specific layer 814. By combining these layers in this order, the quality of the resulting composite image 802 is greatly improved as compared to the prior art techniques.

Figure 9:
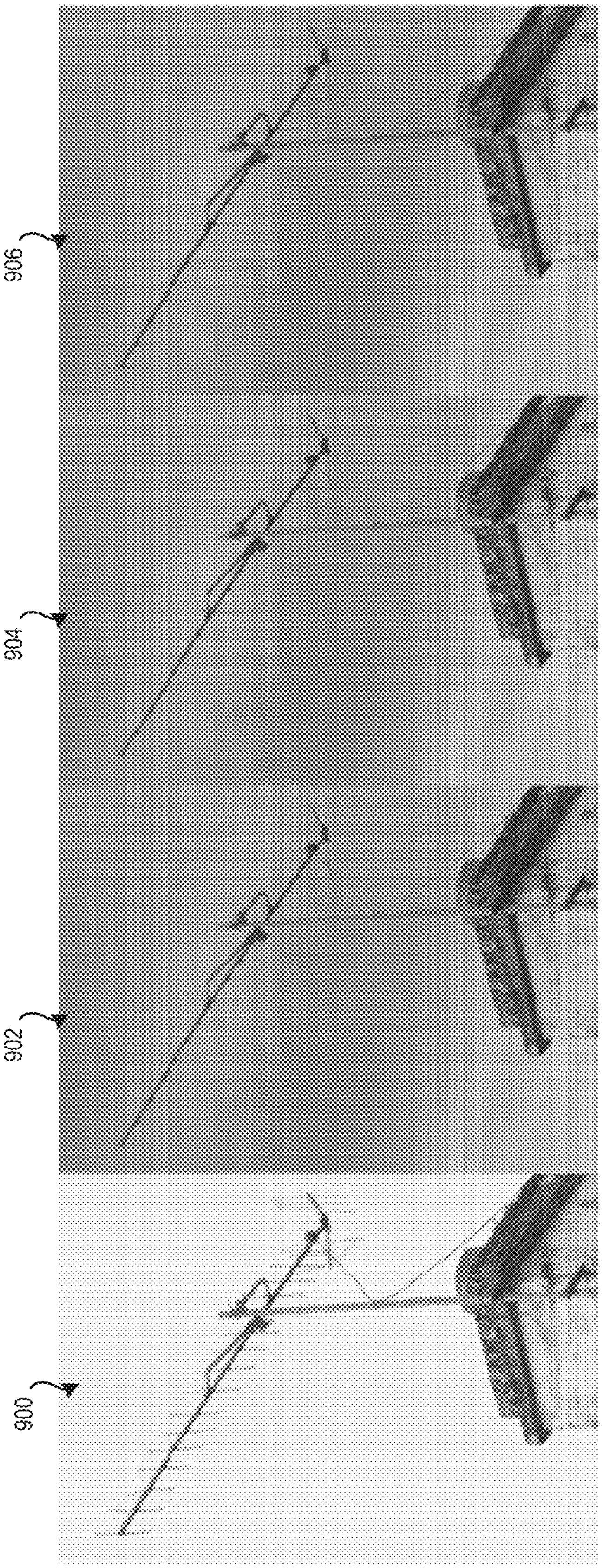
FIGS. 9-10 illustrate examples of sky replacement with edge enhancement in accordance with one or more embodiments.
Figure 10:
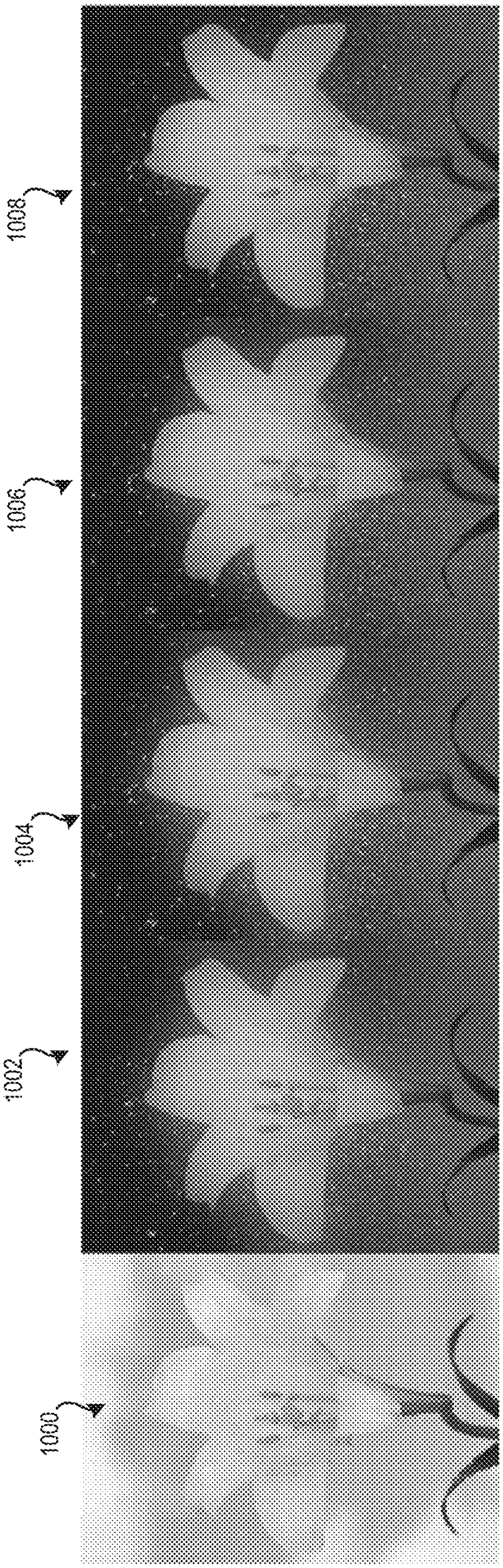

FIGS. 9-10 illustrate examples of sky replacement with edge enhancement in accordance with one or more embodiments. FIG. 9 shows the comparison of sky replacement results using different techniques applied to original image 900. Using one prior technique in 902, the fine detail of the antenna is largely lost. This remains the case in 904 without Edge Lighting, which is created by turning off the Edge Lighting Group in the layer stack. This shows results similar to the prior technique. In 906, where the Edge Lighting Group is turned on by default, the details along the edges are much better preserved while the halo artifacts are significantly reduced.

FIG. 10 shows the comparison of sky replacement results for the second example. This example does not include thin-line objects like the first one, but it demonstrates the effectiveness of the new algorithm for reducing halo artifacts in the cases where the tone difference between the original sky and the new sky is relatively large. Since the default of Fade Edge has been changed to 50 from 100 used in the prior technique, the results for Fade Edge 100 are also shown for a fair comparison. The original image is shown at 1000. As shown at 1002, using the prior technique, a significant halo effect is shown around the flower. This is a result of the prior background colors bleeding through the new background. The example of 1002 is shown with a Fade Edge of 100. Likewise the example at 1004 with no Edge Lighting and Fade Edge of 100 shows substantial halo artifacts around the flower, similar to the prior technique. In contrast, the example at 1006 with Edge Lighting and Fade Edge 100 shows significantly less halos than the previous two results. Finally, the example at 1008 with the default Fade Edge 50 shows the best quality among all other results. This is because the lower Fade Edge value provides a cleaner mask for compositing, which further reduces the halos.

Figure 11:
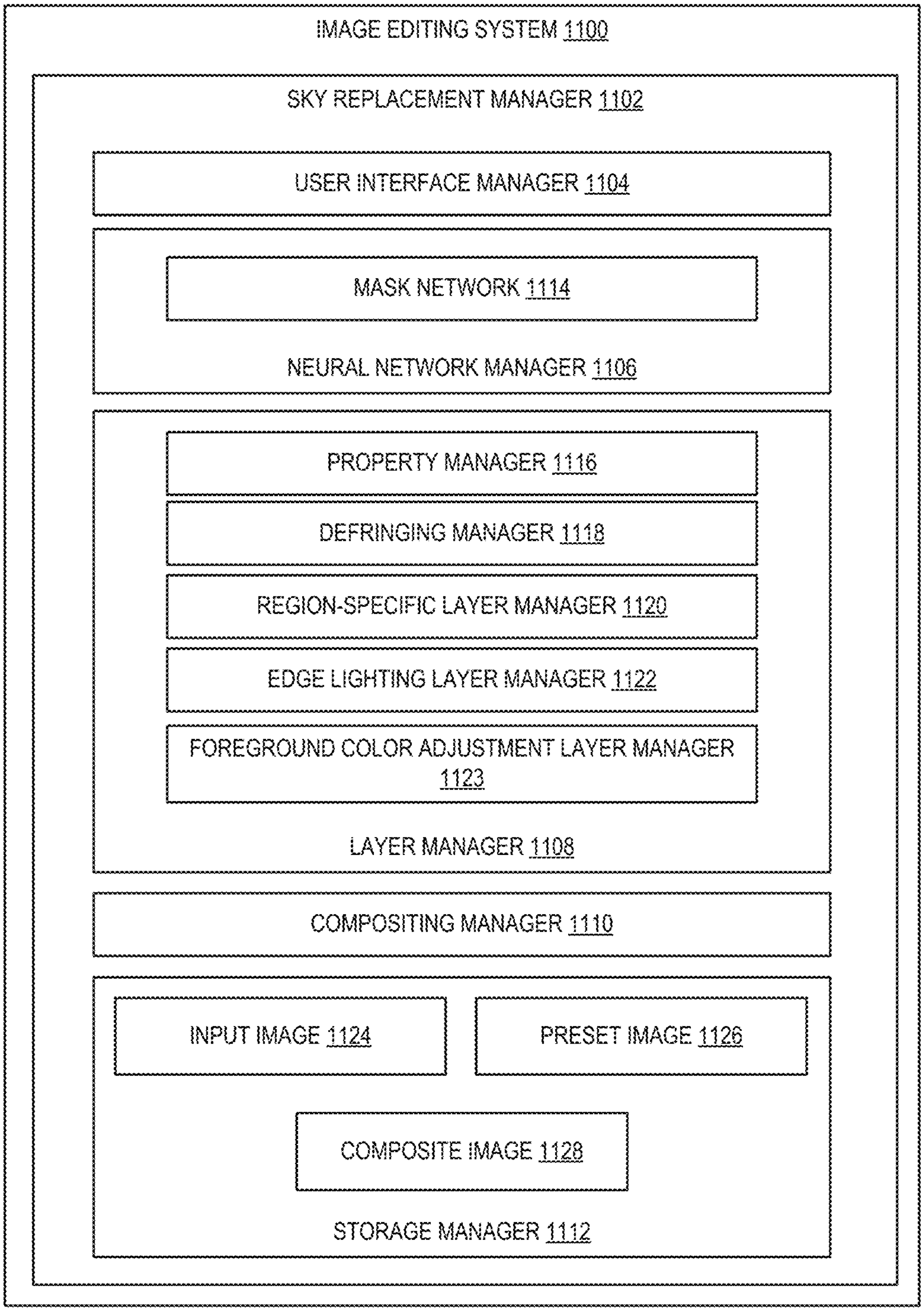
FIG. 11 illustrates a schematic diagram of an image editing system in accordance with one or more embodiments.

FIG. 11 illustrates a schematic diagram of image editing system (e.g., "image editing system" described above) in accordance with one or more embodiments. As shown, the image editing system 1100 may include, but is not limited to, sky replacement manager 1102 which may include a user interface manager 1104, neural network manager 1106, layer manager 1108, compositing manager 1110, and storage manager 1112. The neural network manager 1106 includes one or more mask networks 1114. The layer manager 1108 includes property manager 1116, defringing manager 1118, region-specific layer manager 1120, edge lighting layer manager 1122, and foreground color adjustment layer manager 1123. The storage manager 1112 includes input image 1124, preset image 1126, and composite image 1128.

As illustrated in FIG. 11, the image editing system 1100 includes a user interface manager 1102. For example, the user interface manager 1102 allows users to provide input image 1124 to the image editing system 1100. In some embodiments, the user interface manager 1102 provides a user interface through which the user can upload the input images 1124 which represent the original image which is having a region (such as the sky) swapped with a region of another image (such as a preset), as discussed above. Alternatively, or additionally, the user interface may enable the user to download the images from a local or remote storage location (e.g., by providing an address (e.g., a URL or other endpoint) associated with an image source). In some embodiments, the user interface can enable a user to link an image capture device, such as a camera or other hardware to capture image data and provide it to the image editing system 1100.

Additionally, the user interface manager 1102 allows users to request the image editing system 1100 to perform sky replacement (or other region replacement) on the input image. In some embodiments, the user interface manager 1102 enables the user to view the resulting output image and/or request further edits to the image.

As illustrated in FIG. 11, the image editing system 1100 also includes a neural network manager 1104. Neural network manager 1106 may host a plurality of neural networks or other machine learning models, such as mask network(s) 1114. The neural network manager 1106 may include an execution environment, libraries, and/or any other data needed to execute the machine learning models. In some embodiments, the neural network manager 1106 may be associated with dedicated software and/or hardware resources to execute the machine learning models. Although depicted in FIG. 11 as being hosted by a single neural network manager 1106, in various embodiments the neural networks may be hosted in multiple neural network managers and/or as part of different components.

Mask network 1114 may include one or more segmentation networks (e.g., machine learning models) that are used to generate one or more masks for an input image 1124. As discussed, the mask network(s) 1114 generate a clean mask (e.g., a sharp mask that represents fine edge details), a composite mask (e.g., a soft mask for blending content from different images), and a lighting mask (e.g., a very soft mask for applying lighting adjustment across the boundary of foreground and background). These masks are used to create the replacement layers by the layer manager for use by the compositing manager.

As illustrated in FIG. 11, the image editing system 1100 also includes the layer manager 1108. As discussed above, the sky replacement manager 1102 generates a layer stack to non-destructively replace a region of an input image with a region of a preset image to create a composite image. For example, the sky region of an input image may be replaced with the sky region of a preset (e.g., a reference) image. As discussed, the layer manager is responsible for creating a plurality of layers that are combined in a specific order to create the composite image.

For example, in some embodiments, the defringing manager generates a defringing layer by combining a lighting mask with a grayscale version of the preset image 1126. As discussed, within the layer stack, the defringing layer is located between the foreground color adjustment layer and the edge lighting layer group. According to some embodiments, the region-specific layer manager 1120 generates a region-specific layer by combining the compositing mask with the preset image. As discussed, the compositing mask is a soft mask suitable for blending. In this example, the compositing mask is used for blending the region of the preset image 1126 into the input image 1124. In some examples, the region-specific layer manager 302 includes a brush tool, a fade edge slider, and a shift edge slider.

Additionally, edge lighting layer manager 1122 generates an edge lighting layer group based on the clean mask and the image that results from the defringing layer. In particular, the edge lighting layer group (also referred to herein as the edge lighting layer) includes an edge lighting levels adjustment layer and an edge lighting desaturation layer.

Layer manager 1108 also includes foreground color adjustment layer manager 1123. As discussed, foreground color adjustment layer manager 1123 computes a set of color harmonization curves, where the foreground color adjustment layer is generated based on the color harmonization curves. As discussed, the foreground color adjustment layer applies colors from a background portion of the preset image to a foreground portion of the image.

As discussed, sky replacement is performed on the image automatically, with the only input from the user required being the image and the preset. Property manager 1116 is responsible for picking default values for the layers. These values may be modified later by the user, but the user is not required to set these values before the sky replacement is performed. In some embodiments, the property manager uses the histogram of the composting result of the defringing layer and all layers below it to set highlight, shadow, and midtone properties of the edge lighting layer. Additionally, the property manager can select a blending mode for the edge lighting layer based on the values of the edge pixels compared to the values of the sky (or other region) pixels, as discussed above. The edge lighting layer is located between the region-specific layer and the defringing layer.

As illustrated in FIG. 11, the image editing system 1100 also includes the compositing manager 1110. As discussed, the compositing manager is responsible for combining the layers generated by the layer manager to create composite image 1128. The compositing manager combines the layers in a specific order based on the properties associated with each layer.

As illustrated in FIG. 11, the image editing system 1100 also includes the storage manager 1112. The storage manager 1112 maintains data for the image editing system 1100. The storage manager 1112 can maintain data of any type, size, or kind as necessary to perform the functions of the image editing system 1100. The storage manager 1112, as shown in FIG. 11, includes the input image 1124. The input image 1124 can include any digital image which includes a region the user wants to replace, as discussed in additional detail above.

As further illustrated in FIG. 11, the storage manager 1112 also includes preset image 1126. As discussed, preset image 1126 may be a reference image selected by the user (e.g., from a preset library or similar data store) or provided by the user directly. The preset image 1126 includes replacement image data that is to be composited into the input image 1124. For example, the sky region of the preset image 1126 may be used to replace the sky region of the input image 1124. As discussed, the layers are combined in a specific order by the compositing manager to create the composite image 1128 which can then be presented to the user.

Each of the components 1102-1112 of the image editing system 1100 and their corresponding elements (as shown in FIG. 11) may be in communication with one another using any suitable communication technologies. It will be recognized that although components 1102-1112 and their corresponding elements are shown to be separate in FIG. 11, any of components 1102-1112 and their corresponding elements may be combined into fewer components, such as into a single facility or module, divided into more components, or configured into different components as may serve a particular embodiment.

The components 1102-1112 and their corresponding elements can comprise software, hardware, or both. For example, the components 1102-1112 and their corresponding elements can comprise one or more instructions stored on a computer-readable storage medium and executable by processors of one or more computing devices. When executed by the one or more processors, the computer-executable instructions of the image editing system 1100 can cause a client device and/or a server device to perform the methods described herein. Alternatively, the components 1102-1112 and their corresponding elements can comprise hardware, such as a special purpose processing device to perform a certain function or group of functions. Additionally, the components 1102-1112 and their corresponding elements can comprise a combination of computer-executable instructions and hardware.

Furthermore, the components 1102-1112 of the image editing system 1100 may, for example, be implemented as one or more stand-alone applications, as one or more modules of an application, as one or more plug-ins, as one or more library functions or functions that may be called by other applications, and/or as a cloud-computing model. Thus, the components 1102-1112 of the image editing system 1100 may be implemented as a stand-alone application, such as a desktop or mobile application. Furthermore, the components 1102-1112 of the image editing system 1100 may be implemented as one or more web-based applications hosted on a remote server. Alternatively, or additionally, the components of the image editing system 1100 may be implemented in a suite of mobile device applications or "apps."

As shown, the image editing system 1100 can be implemented as a single system. In other embodiments, the image editing system 1100 can be implemented in whole, or in part, across multiple systems. For example, one or more functions of the image editing system 1100 can be performed by one or more servers, and one or more functions of the image editing system 1100 can be performed by one or more client devices. The one or more servers and/or one or more client devices may generate, store, receive, and transmit any type of data used by the image editing system 1100, as described herein.

In one implementation, the one or more client devices can include or implement at least a portion of the image editing system 1100. In other implementations, the one or more servers can include or implement at least a portion of the image editing system 1100. For instance, the image editing system 1100 can include an application running on the one or more servers or a portion of the image editing system 1100 can be downloaded from the one or more servers. Additionally or alternatively, the image editing system 1100 can include a web hosting application that allows the client device(s) to interact with content hosted at the one or more server(s).

The server(s) and/or client device(s) may communicate using any communication platforms and technologies suitable for transporting data and/or communication signals, including any known communication technologies, devices, media, and protocols supportive of remote data communications, examples of which will be described in more detail below with respect to FIG. 13. In some embodiments, the server(s) and/or client device(s) communicate via one or more networks. A network may include a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. The one or more networks will be discussed in more detail below with regard to FIG. 13.

The server(s) may include one or more hardware servers (e.g., hosts), each with its own computing resources (e.g., processors, memory, disk space, networking bandwidth, etc.) which may be securely divided between multiple customers (e.g. client devices), each of which may host their own applications on the server(s). The client device(s) may include one or more personal computers, laptop computers, mobile devices, mobile phones, tablets, special purpose computers, TVs, or other computing devices, including computing devices described below with regard to FIG. 13.

Figure 12:
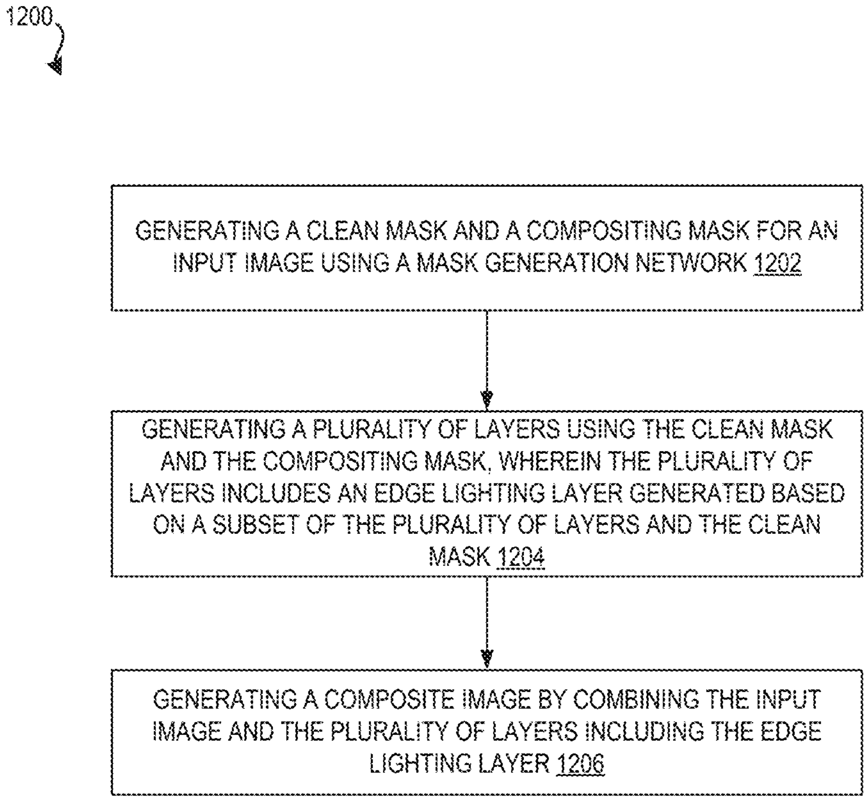
FIG. 12 illustrates a flowchart of a series of acts in a method of sky replacement with edge enhancement in accordance with one or more embodiments.

FIGS. 1-11, the corresponding text, and the examples, provide a number of different systems and devices that enable sky replacement. In addition to the foregoing, embodiments can also be described in terms of flowcharts comprising acts and steps in a method for accomplishing a particular result. For example, FIG. 12 illustrates a flowchart of an exemplary method in accordance with one or more embodiments. The method described in relation to FIG. 12 may be performed with fewer or more steps/acts or the steps/acts may be performed in differing orders. Additionally, the steps/acts described herein may be repeated or performed in parallel with one another or in parallel with different instances of the same or similar steps/acts.

FIG. 12 illustrates a flowchart 1200 of a series of acts in a method of sky replacement with edge enhancement in accordance with one or more embodiments. In one or more embodiments, the method 1200 is performed in a digital medium environment that includes the image editing system 1100. The method 1200 is intended to be illustrative of one or more methods in accordance with the present disclosure and is not intended to limit potential embodiments. Alternative embodiments can include additional, fewer, or different steps than those articulated in FIG. 12.

As illustrated in FIG. 12, the method 1200 includes an act 1202 of generating a clean mask and a compositing mask for an input image using a mask generation network. As discussed, in some embodiments the mask generation network (also referred to as mask network) can generate a clean mask and a composite mask. In some embodiments, multiple mask networks may be used (e.g., a first mask network to generate the clean mask and a second mask network to generate the compositing mask, etc.). In some examples, the mask network includes a convolutional neural network (CNN). A CNN is a class of neural network that is commonly used in computer vision or image classification systems. The mask network may be trained to receive image data and output a segmentation mask which masks all or portions of the image data, based on how the network was trained.

As illustrated in FIG. 12, the method 1200 includes an act 1204 of generating a plurality of layers using the clean mask and the compositing mask, wherein the plurality of layers includes an edge lighting layer generated based on a subset of the plurality of layers and the clean mask. In some embodiments, generating a plurality of layers using the clean mask and the compositing mask, further includes generating a defringing layer by combining a lighting mask with a grayscale version of a second image. In some embodiments, generating a plurality of layers further includes generating a region-specific layer by combining the compositing mask with the second image.

As illustrated in FIG. 12, the method 1200 includes an act 1206 of generating a composite image by combining the input image and the plurality of layers including the edge lighting layer. In some embodiments, generating a composite image by combining the input image and the plurality of layers including the edge lighting layer further includes combining, in order, the input image, the foreground color adjustment layer, the defringing layer, the edge lighting layer, and the region-specific layer to generate the composite image.

In some embodiments, a blending mode of the edge lighting layer is determined independently of other layers from the plurality of layers. In some embodiments, the blending mode is determined by identifying a plurality of edge pixels and a plurality of sky pixels in the input image, determining an average level of the plurality of edge pixels, determining an average level of the plurality of sky pixels, calculating a difference between the average level of the plurality of edge pixels and the average level of the plurality of sky pixels, comparing the difference to a threshold value, and determining the blending mode based on the comparison. In some embodiments, the blending mode is a multiply blend mode or a screen blend mode. In some embodiments, generating the composite image further includes combining the edge lighting layer with the subset of the plurality of layers based on the blending mode.

In some embodiments, a method includes receiving a request to replace a sky region of a first image with a sky image of a second image, obtaining a plurality of masks based on the first image, generating a plurality of sky replacement layers, including a defringing layer, an edge lighting layer, and a sky region layer, and compositing the plurality of sky replacement layers and the first image in an order of the first image followed by the foreground color adjustment layer, the defringing layer followed by the edge lighting layer and followed by the sky region layer to generate a composite image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other non-transitory storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
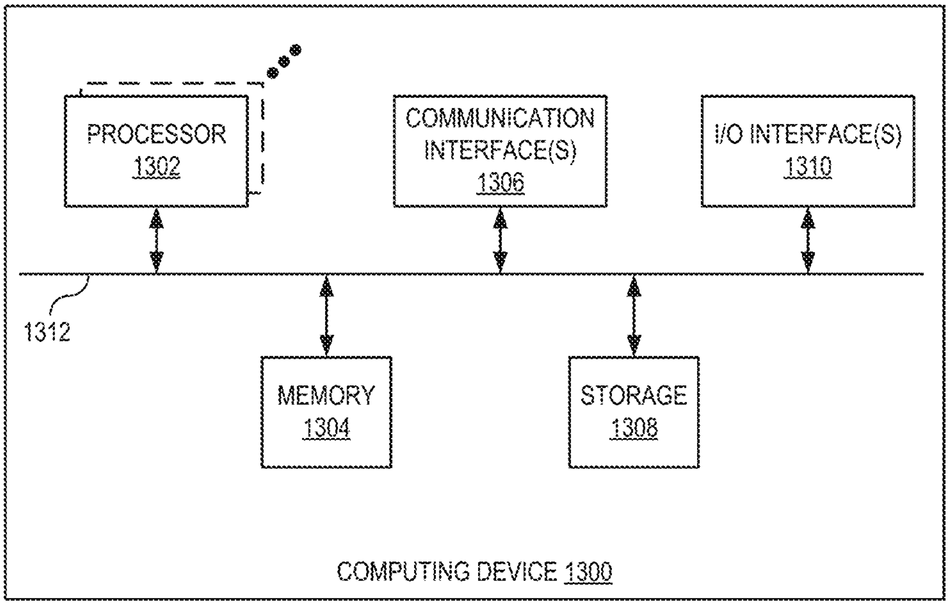
FIG. 13 illustrates a block diagram of an exemplary computing device in accordance with one or more embodiments.

FIG. 13 illustrates, in block diagram form, an exemplary computing device 1300 that may be configured to perform one or more of the processes described above. One will appreciate that one or more computing devices such as the computing device 1300 may implement the image editing system. As shown by FIG. 13, the computing device can comprise a processor 1302, memory 1304, one or more communication interfaces 1306, a storage device 1308, and one or more I/O devices/interfaces 1310. In certain embodiments, the computing device 1300 can include fewer or more components than those shown in FIG. 13. Components of computing device 1300 shown in FIG. 13 will now be described in additional detail.

In particular embodiments, processor(s) 1302 includes hardware for executing instructions, such as those making up a computer program. As an example, and not by way of limitation, to execute instructions, processor(s) 1302 may retrieve (or fetch) the instructions from an internal register, an internal cache, memory 1304, or a storage device 1308 and decode and execute them. In various embodiments, the processor(s) 1302 may include one or more central processing units (CPUs), graphics processing units (GPUs), field programmable gate arrays (FPGAs), systems on chip (SoC), or other processor(s) or combinations of processors.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1304 may be internal or distributed memory.

The computing device 1300 can further include one or more communication interfaces 1306. A communication interface 1306 can include hardware, software, or both. The communication interface 1306 can provide one or more interfaces for communication (such as, for example, packet-based communication) between the computing device and one or more other computing devices 1300 or one or more networks. As an example and not by way of limitation, communication interface 1306 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can comprise hardware, software, or both that couples components of computing device 1300 to each other.

The computing device 1300 includes a storage device 1308 includes storage for storing data or instructions. As an example, and not by way of limitation, storage device 1308 can comprise a non-transitory storage medium described above. The storage device 1308 may include a hard disk drive (HDD), flash memory, a Universal Serial Bus (USB) drive or a combination these or other storage devices. The computing device 1300 also includes one or more input or output ("I/O") devices/interfaces 1310, which are provided to allow a user to provide input to (such as user strokes), receive output from, and otherwise transfer data to and from the computing device 1300. These I/O devices/interfaces 1310 may include a mouse, keypad or a keyboard, a touch screen, camera, optical scanner, network interface, modem, other known I/O devices or a combination of such I/O devices/interfaces 1310. The touch screen may be activated with a stylus or a finger.

The I/O devices/interfaces 1310 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1310 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:

generating a clean mask and a compositing mask for an input image using a mask generation network, wherein the clean mask includes edge information corresponding to a boundary between a foreground and a background in the input image, and wherein the mask generation network includes one or more segmentation networks trained to generate one or more masks for input images;

generating a plurality of layers using the clean mask and the compositing mask, wherein the plurality of layers includes an edge lighting layer generated based on a subset of the plurality of layers and the clean mask; and generating a composite image by combining the input image and the plurality of layers including the edge lighting layer.

2. The method of claim 1, wherein generating a plurality of layers using the clean mask and the compositing mask, further comprises:

generating a defringing layer by combining a lighting mask with a grayscale version of a second image.

3. The method of claim 2, further comprising:

generating a region-specific layer by combining the compositing mask with the second image.

4. The method of claim 3, wherein generating a composite image by combining the input image and the plurality of layers including the edge lighting layer further comprises:

combining, in order, the input image, a foreground color adjustment layer, the defringing layer, the edge lighting layer, and the region-specific layer to generate the composite image.

5. The method of claim 1, further comprising:

determining a blending mode of the edge lighting layer independently of other layers from the plurality of layers.

6. The method of claim 5, wherein determining a blending mode of the edge lighting layer independently of other layers from the plurality of layers further comprises:

identifying a plurality of edge pixels and a plurality of sky pixels in the input image;

determining an average level of the plurality of edge pixels;

determining an average level of the plurality of sky pixels;

calculating a difference between the average level of the plurality of edge pixels and the average level of the plurality of sky pixels;

comparing the difference to a threshold value; and determining the blending mode based on the comparison.

7. The method of claim 6, wherein the blending mode is a multiply blend mode or a screen blend mode.

8. The method of claim 6, wherein generating a composite image by combining the input image and the plurality of layers including the edge lighting layer further comprises:

combining the edge lighting layer with the subset of the plurality of layers based on the blending mode.

9. A non-transitory computer-readable medium storing executable instructions, which when executed by a processing device, cause the processing device to perform operations comprising:

generating a clean mask and a compositing mask for an input image using a mask generation network, wherein the clean mask includes edge information corresponding to a boundary between a foreground and a background in the input image, and wherein the mask generation network includes one or more segmentation networks trained to generate one or more masks for input images;

generating a plurality of layers using the clean mask and the compositing mask, wherein the plurality of layers includes an edge lighting layer generated based on a subset of the plurality of layers and the clean mask; and generating a composite image by combining the input image and the plurality of layers including the edge lighting layer.

10. The non-transitory computer-readable medium of claim 9, wherein the operation of generating a plurality of layers using the clean mask and the compositing mask, further comprises:

generating a defringing layer by combining a lighting mask with a grayscale version of a second image.

11. The non-transitory computer-readable medium of claim 10, wherein the operations further comprise:

generating a region-specific layer by combining the compositing mask with the second image.

12. The non-transitory computer-readable medium of claim 11, wherein the operation of generating a composite image by combining the input image and the plurality of layers including the edge lighting layer further comprises:

combining, in order, the input image, a foreground color adjustment layer, the defringing layer, the edge lighting layer, and the region-specific layer to generate the composite image.

13. The non-transitory computer-readable medium of claim 9, wherein the operations further comprise:

determining a blending mode of the edge lighting layer independently of other layers from the plurality of layers.

14. The non-transitory computer-readable medium of claim 13, wherein the operation of determining a blending mode of the edge lighting layer independently of other layers from the plurality of layers further comprises:

identifying a plurality of edge pixels and a plurality of sky pixels in the input image;

determining an average level of the plurality of edge pixels;

determining an average level of the plurality of sky pixels;

calculating a difference between the average level of the plurality of edge pixels and the average level of the plurality of sky pixels;

comparing the difference to a threshold value; and determining the blending mode based on the comparison.

15. The non-transitory computer-readable medium of claim 14, wherein the blending mode is a multiply blend mode or a screen blend mode.

16. The non-transitory computer-readable medium of claim 15, wherein the operation of generating a composite image by combining the input image and the plurality of layers including the edge lighting layer further comprises:

combining the edge lighting layer with the subset of the plurality of layers based on the blending mode.

17. A system comprising:

a memory component; and a processing device coupled to the memory component, the processing device to perform operations comprising:

receiving a request to replace a sky region of a first image with a sky image of a second image;

obtaining a plurality of masks based on the first image using a mask generation network, the plurality of masks including a clean mask and a compositing mask, wherein the clean mask includes edge information corresponding to a boundary between a foreground and a background in the first image, and wherein the mask generation network includes one or more segmentation networks trained to generate one or more masks for input images;

generating a plurality of sky replacement layers, including a foreground color adjustment layer, a defringing layer, an edge lighting layer, and a sky region layer; and compositing the plurality of sky replacement layers and the first image in an order of the first image followed by the foreground color adjustment layer, the defringing layer followed by the edge lighting layer and followed by the sky region layer to generate a composite image.

18. The system of claim 17, wherein the operations further comprise:

determining a blending mode of the edge lighting layer independently of other layers from the plurality of layers.

19. The system of claim 18, wherein the operation of determining a blending mode of the edge lighting layer independently of other layers from the plurality of layers further comprises:

identifying a plurality of edge pixels and a plurality of sky pixels in the first image;

determining an average level of the plurality of edge pixels;

determining an average level of the plurality of sky pixels;

calculating a difference between the average level of the plurality of edge pixels and the average level of the plurality of sky pixels;

comparing the difference to a threshold value; and determining the blending mode based on the comparison.

20. The system of claim 19, wherein the blending mode is a multiply blend mode or a screen blend mode.

* * * * *